(12) United States Patent
Girodo et al.

(10) Patent No.: US 7,904,994 B2
(45) Date of Patent: Mar. 15, 2011

(54) MOUNTING DEVICE FOR A FASTENING SYSTEM TRIM ELEMENTS TO VEHICLE BODY

(75) Inventors: Franco Girodo, Tavagnasso (IT); Calogero Serrone, Grugliasco (IT)

(73) Assignee: ITW Automotive Italia S.r.L. Con Unico Socio, Turin (IT)

( * ) Notice: Subject to any disclaimer, the term of this patent is extended or adjusted under 35 U.S.C. 154(b) by 0 days.

(21) Appl. No.: 12/097,369

(22) PCT Filed: Dec. 14, 2006

(86) PCT No.: PCT/IB2006/003616
§ 371 (c)(1),
(2), (4) Date: Jun. 13, 2008

(87) PCT Pub. No.: WO2007/069057
PCT Pub. Date: Jun. 21, 2007

(65) Prior Publication Data
US 2008/0260454 A1  Oct. 23, 2008

(30) Foreign Application Priority Data

Dec. 15, 2005  (IT) .............................. TO2005A0874

(51) Int. Cl.
*A44B 1/04* (2006.01)
(52) U.S. Cl. ............................... 24/297; 24/453; 24/458
(58) Field of Classification Search .................... 403/11, 403/194, 195, 238, 243, 329, 397, DIG. 14; 24/297, 453, 458; 411/45–48, 508, 512, 411/913
See application file for complete search history.

(56) References Cited

U.S. PATENT DOCUMENTS

| 5,106,223 A | 4/1992 | Kraus |
| 5,106,225 A * | 4/1992 | Andre et al. .................. 411/182 |
| 5,353,571 A | 10/1994 | Berdan et al. |
| 5,482,348 A * | 1/1996 | Mass et al. ..................... 411/535 |
| 5,651,632 A | 7/1997 | Gordon |
| 6,394,695 B1 | 5/2002 | Chausset |

(Continued)

FOREIGN PATENT DOCUMENTS

| DE | 4014589 C1 | 8/1991 |
| DE | 4217513 A1 | 12/1992 |
| EP | 0735286 A1 | 10/1996 |

(Continued)

OTHER PUBLICATIONS

ISR for PCT/IB2006/003616 dated Jun. 25, 2007.

*Primary Examiner* — Victor MacArthur
(74) *Attorney, Agent, or Firm* — Lowe Hauptman Ham & Berner LLP

(57) ABSTRACT

Mounting device for connecting a fastening system selected from a number of available standard fastening systems to an automotive finishing element like e.g. a door inner panel, a dashboard, etc designed to be fixed to a vehicle body; the mounting device consists in: a standardized mounting tower provided integral with or fixable to said automotive finishing element; and in an intermediate, shallow mounting element designed to be interposed between the fastening system and the mounting tower, having first and second coupling means; said first coupling means being designed to mate with first coupling means of the fastening system designed to provide anchorage with the mounting tower; and said second coupling means being of the snap-on kind and being designed to mate with an attachment seat of prefixed shape for said shallow mounting element provided in said mounting tower, on a side thereof opposite to the automotive finishing element to be mounted.

16 Claims, 3 Drawing Sheets

U.S. PATENT DOCUMENTS

| | | | |
|---|---|---|---|
| 6,457,924 B1 * | 10/2002 | Wallace | 411/112 |
| 6,594,870 B1 * | 7/2003 | Lambrecht et al. | 24/297 |
| 2003/0000048 A1 | 1/2003 | Boville | |
| 2004/0139584 A1 | 7/2004 | Gibbons et al. | |

FOREIGN PATENT DOCUMENTS

| | | |
|---|---|---|
| EP | 1439313 A2 | 7/2004 |
| FR | 2780115 A1 | 12/1999 |
| WO | 0150026 A1 | 7/2001 |

* cited by examiner

US 7,904,994 B2

MOUNTING DEVICE FOR A FASTENING SYSTEM TRIM ELEMENTS TO VEHICLE BODY

RELATED APPLICATIONS

The present application is based on International Application Number PCT/IB2006/003616 filed Dec. 14, 2006, and claims priority from Italian Application Number TO2005A000874 filed Dec. 15, 2005, the disclosures of which are hereby incorporated by reference herein in their entirety.

TECHNICAL FIELD

The present invention relates to a mounting device for connecting a fastening system selected from a number of available standard fastening systems to an automotive finishing element like e.g. a door inner panel or a dashboard, designed to be fixed to a body of a vehicle via said selected fastening system.

BACKGROUND ART

It is known in the art that fixing of automotive finishing elements like panels, profiles, dashboards or parts thereof to the elements of the body of vehicle is provided through the use of fastening systems consisting essentially in a toothed pin having a mounting head, a bush and a sealing element interposed there between; the toothed shank of the pin is designed to engage into slots provided in the body elements and to adapt axially there into in order to compensate the misalignments between the finishing element and the body element receiving it due to the working tolerances; the mounting head is designed to fit into a mounting seat provided in assembly portions of the finishing element, known as "mounting towers", which act as mounting devices for the fastening systems.

Since a plurality of differently shaped fastening systems are currently in use, each tailored for a specific application, namely to fasten a specific finishing element or a specific part of one same finishing element to a specific part of the body of the vehicle, it is necessary to provide the finishing elements to be mounted with a wide different kind of mounting towers, each shaped to receive a fastening system specifically selected among those available in the art.

The mounting devices described above create not many difficulties in the assembly phase of the fastening system to the mounting tower, which result in slowing down the assembly operations with an increase of costs; moreover they increase the cost of the finishing elements themselves since they require to adopt very strict tolerances in shaping the mounting towers; last but not the least, the complex shape required for the mounting seats to receive the mounting heads of the fastening systems results quite often in creating degassing and shrinkage problems during the molding phase through which the mounting towers and eventually the whole finishing element are obtained; this results in incomplete pieces, so generating a relatively high number of rejects or, worse, molded articles which are not reliable and can break in use.

DISCLOSURE OF INVENTION

It is an object of the present invention to overcome the aforesaid drawbacks by providing a mounting device for fastening systems designed to anchor a finishing element to a body of any kind of vehicles that allow at the same time to make the assembly operation of the finishing element to the vehicle body easier and quicker, and to reduce the production cost of the currently used finishing elements (or at least of the mounting towers thereof), while increasing the reliability thereof and dramatically reducing the possible number of rejects.

It is also an object of the present invention to provide a mounting device for fastening systems of finishing elements of a vehicle body which allow the fastening systems to be preassembled in their mounting seats on the finishing element side.

The present invention accordingly relates to a mounting device for connecting a fastening system selected from a number of available standard fastening systems to an automotive finishing element designed to be anchored to a body of a vehicle via said selected fastening system, as defined in Claim 1.

Here and in the description that follows the term "automotive" is to be intended as merely by way of example and not to be limitative, including therefore any kind of vehicle (automobiles, trucks, vans, airplanes, ships, boats, etc.).

The mounting device according to the invention comprises a mounting tower provided integral with or fixable to said automotive finishing element; and means for anchoring said selected fastening system to said mounting tower.

According to one aspect of the invention said means for anchoring said selected fastening system to said mounting tower comprise an intermediate, shallow mounting element designed to be interposed between the fastening system and the mounting tower. first and second coupling means are moreover provided integral on said shallow mounting element.

The first coupling means of the shallow mounting element are designed to mate with first coupling means of the fastening system originally designed to provide anchorage with traditional mounting towers; and the second coupling means of the shallow mounting element are selected of the snap-on kind and are designed to mate with an attachment seat of prefixed shape for the shallow mounting element provided in the mounting tower, on a side thereof opposite to said automotive finishing element to be mounted.

In this manner, the mounting towers may be equipped with standard types of attachment seats, making it possible to simplify the shape of the mounting towers and to dramatically reduce the necessary number of different kind of mounting towers to only one or two.

Moreover, the assembly of the fastening systems is no more to be carried out directly onto the mounting towers or the finishing elements to be assembled, but can be carried out separately onto the shallow mounting elements, so as to obtain also a preassembly of the fastening systems; then, the unit so created, constituted by the fastening system and the shallow mounting element may be assembled onto the mounting towers with very simple movements only, so allowing for automatic assembly too.

Last but not the least, strict working tolerances, in order to avoid assembly problems, are necessary solely for obtaining the first coupling means of the shallow mounting elements, so that the production costs of the finishing elements and of the mounting towers (that only have standard types of attachment seats of anyway simple shape) are dramatically reduced due to the possibility to adopt less strict working tolerances. At the same time the number of rejects is reduced and every piece produced is of reliable operation.

BRIEF DESCRIPTION OF THE DRAWINGS

Further characteristics and advantages of the present invention will be apparent from the following description of a non limitative embodiment thereof, given purely by way of example with reference to the figures of the attached drawings, wherein.

BEST MODE FOR CARRYING OUT THE INVENTION

Figure 1:
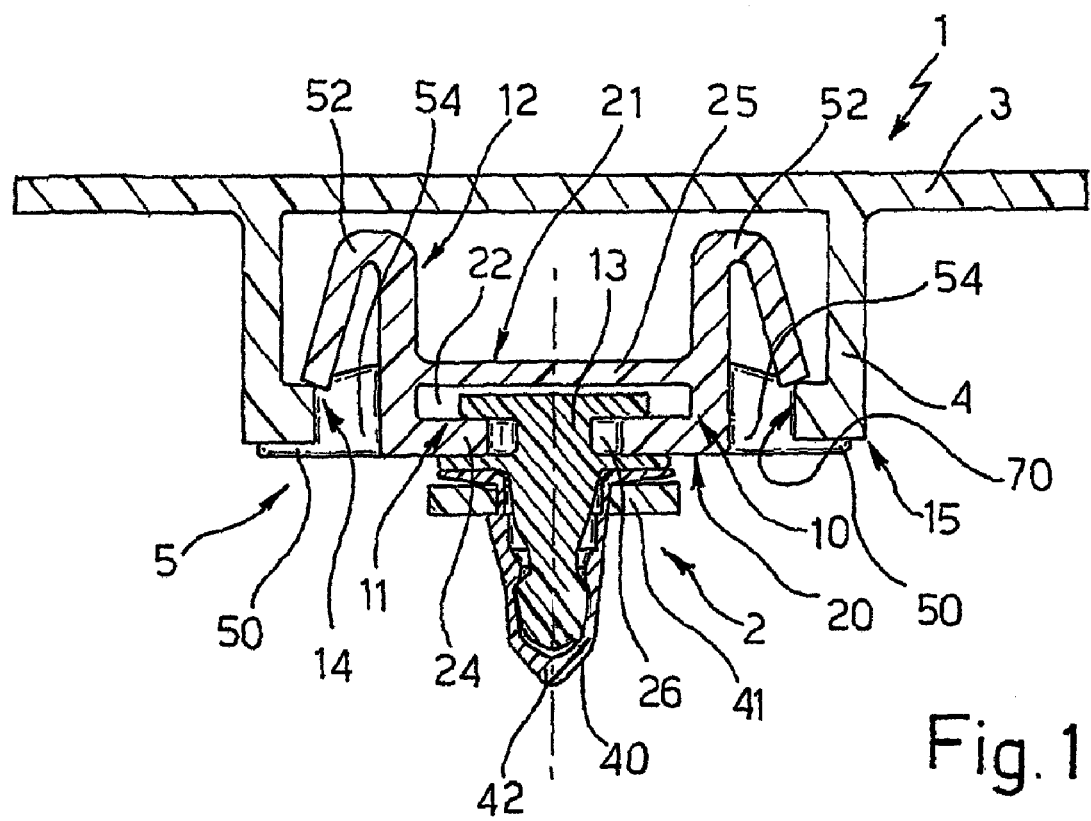
FIG. 1 shows a cross-sectional lateral view of a first embodiment of the present invention.

With reference to FIGS. 1, 3, 4 and 5, reference number 1 indicates as a whole a mounting device for connecting a fastening system 2 selected from a number of standard fastening systems available in the art to an automotive finishing element 3, like e.g. a door inner panel or a dashboard, shown only schematically in FIG. 1; finishing element 3 is designed to be fixed in a known manner to a body of a vehicle, both known and not shown for sake of simplicity, via the selected fastening system 2.

Mounting device 1 comprises a mounting tower 4 provided integral with or fixable to the automotive finishing element 3; and means, indicated as a whole by reference number 5, for anchoring the selected fastening system 2 to mounting tower 4.

According to one aspect of the invention, anchoring means 5 comprise: an intermediate, shallow mounting element 10 designed to be interposed between the fastening system 2 and the mounting tower 4; and first coupling means 11 and second coupling means 12 provided integral on shallow mounting element 10.

The first coupling means 11 are designed to mate with first coupling means 13 (of known kind) of the fastening system 2 designed to provide anchorage with the mounting tower 4; and the second coupling means 12 are selected of the snap-on kind and are designed to mate with an attachment seat 14 of prefixed shape for the shallow mounting element 10; seat 14 is provided in the mounting tower 4, on a side thereof opposite to the automotive finishing element 3 to be mounted.

Figure 4:
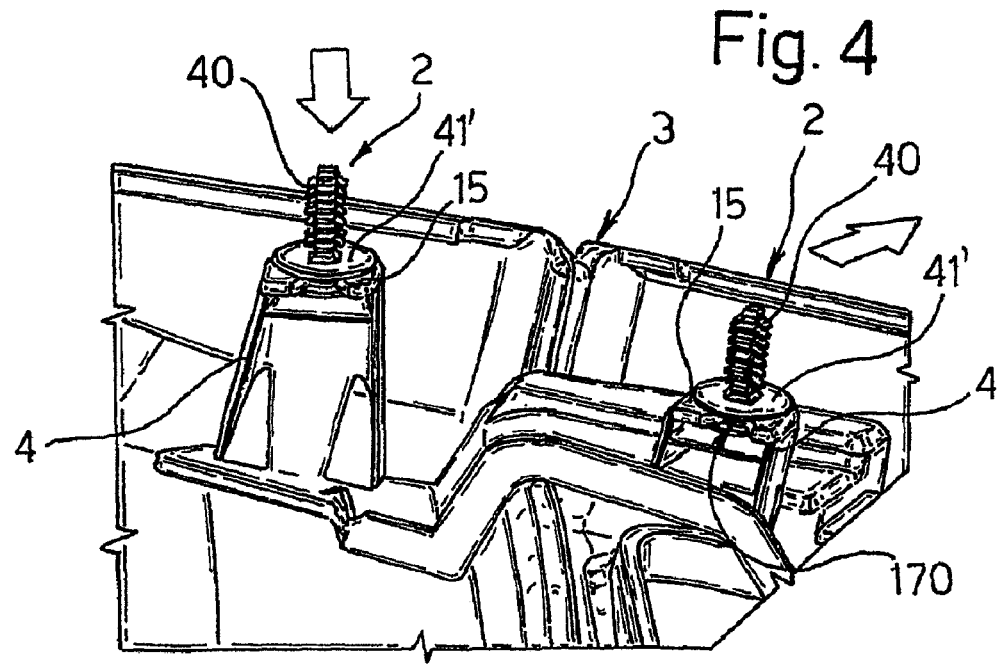
Figure 5:
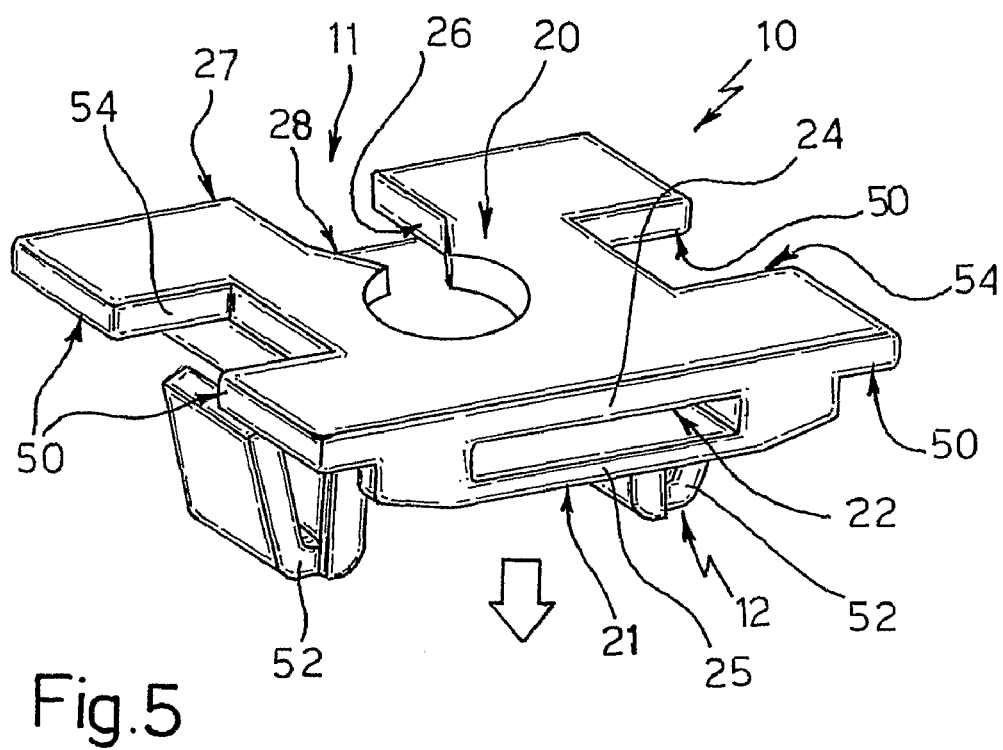
FIGS. 5 and 6 show perspective views in an enlarged scale of a main component of the embodiments of FIGS. 1 and 2 respectively.

In particular, seat 14 is provided at a top end 15 of the mounting tower 4 distant from the finishing element 3 and is shaped to receive in a sliding manner the mounting element 10 in a direction and versus shown by the arrows in FIGS. 4 and 5, in the case in point substantially perpendicular to the laying plane of the finishing element 3 bearing the mounting tower 4.

The shallow mounting element 10 (FIG. 5) consists of an injection molded base plate delimited between a first flat surface 20 and a second flat surface 21, facing in use the selected fastening system 2 and the mounting tower 4, respectively; first coupling means 11 are provided in correspondence with the first flat surface 20, while the second coupling means 12 are provided, in this first embodiment, facing opposite to the flat surface 20.

Moreover, the base plate 10 is substantially square shaped in a plan view and is provided with a channel shaped through seat 22 laying parallel to said first and second flat surfaces 20 and 21, and delimited between a first flat wall 24 and a second flat wall 25 defining, externally to the base plate 10, the first flat surface 20 and the second flat surface 21, respectively.

The first coupling means 11 of the shallow mounting element 10 consist of the afore described through seat 22 and of a shaped perforation 26 provided through the first flat wall 24, which is designed to face in use the selected fastening system 2 to be mounted; the through perforation 26 is provided perpendicular to the through seat 22 and is designed to interrupt one side 27 (FIG. 5) of the base plate 10 so as that perforation 26 remains laterally open in correspondence with one open end 28 of the through seat 22.

Figure 2:
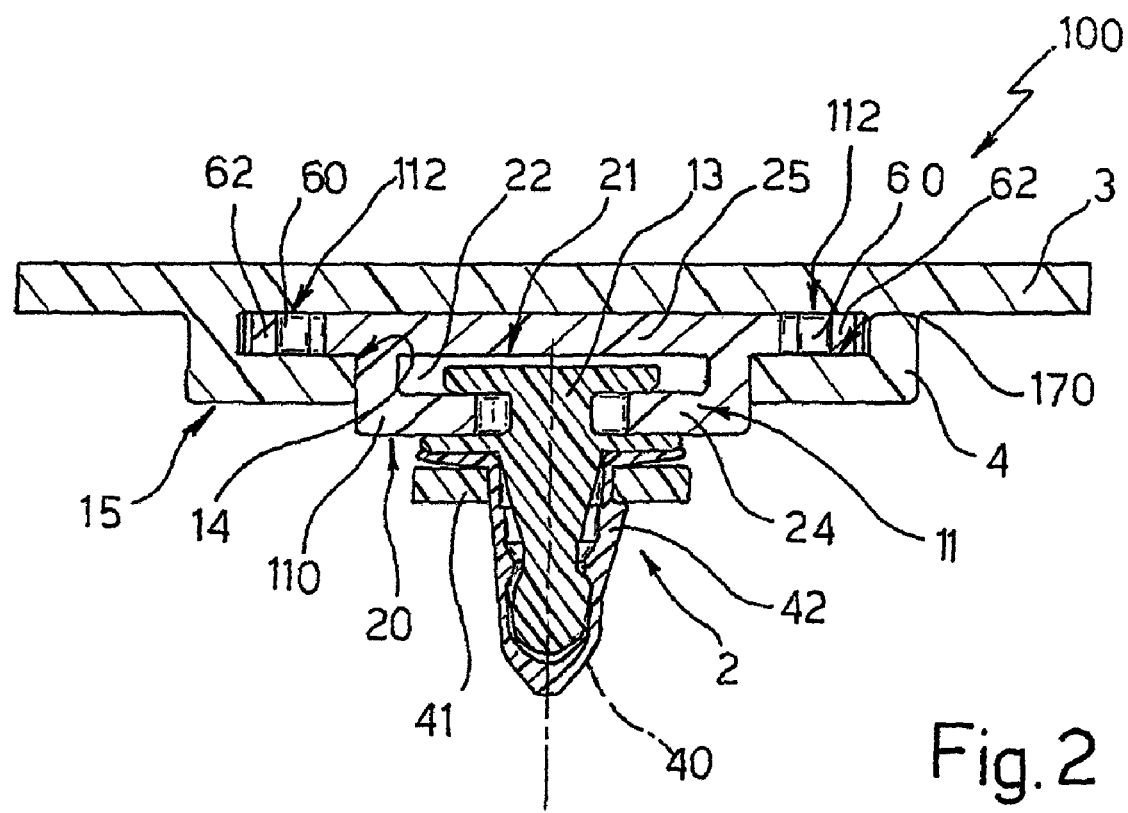
FIG. 2 shows the same cross-sectional view of FIG. 1 of a second embodiment of the present invention.
Figure 3:
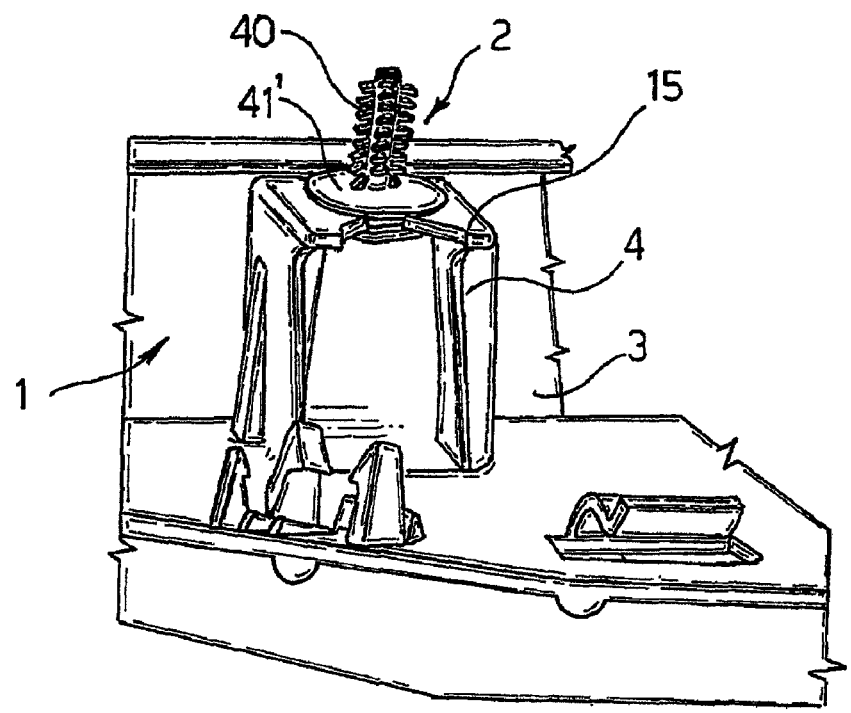
FIGS. 3 and 4 show example of application of the embodiments of FIGS. 1 and 2 to a finishing door panel of a vehicle.
Figure 6:
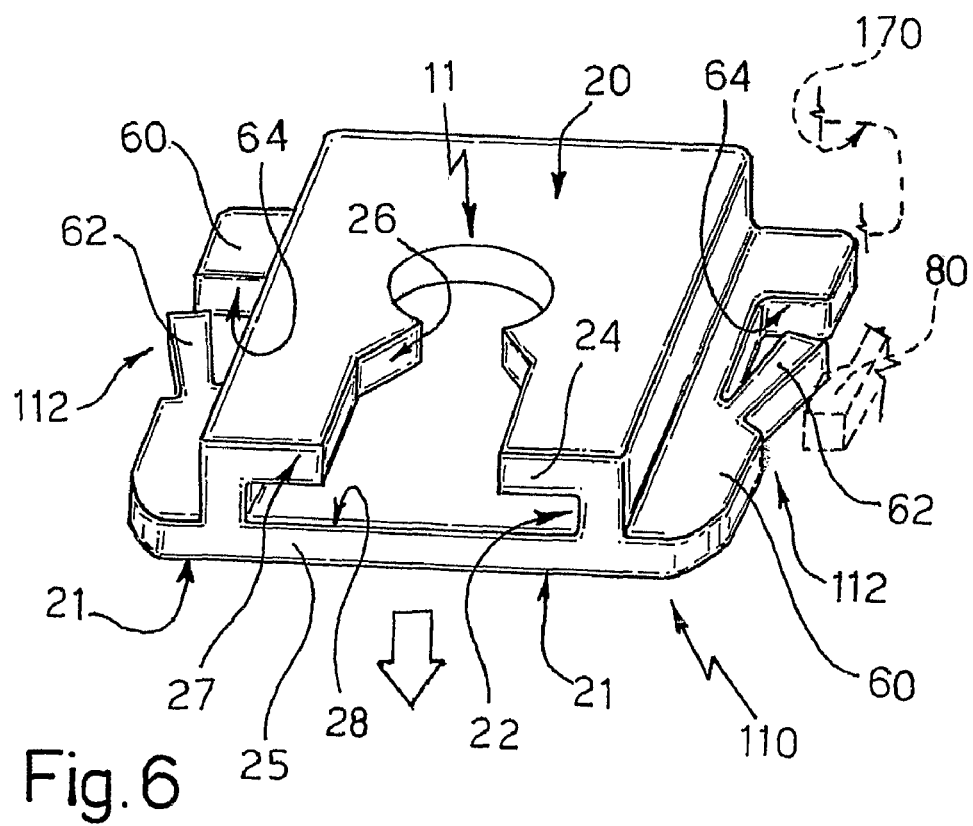

With reference to FIGS. 2 and 6, they show a second possible embodiment of the mounting device according to the present invention, indicated as a whole with reference number 100. The details similar to or identical with the details already described with reference to the embodiment of FIG. 1 are indicated with the same reference numbers, for sake of simplicity.

In particular, mounting device 100 also comprises a mounting tower 4 provided integral with or fixable to the automotive finishing element 3; and means, indicated as a whole by reference number 5, for anchoring a selected fastening system 2 to mounting tower 4; anchoring means 5 in turn comprise an intermediate, shallow mounting element 110 similar in general shape to element 10 and designed to be interposed between the fastening system 2 and the mounting tower 4; and first coupling means 11 and second coupling means 112 provided integral on shallow mounting element 110.

Shallow mounting element 110, likewise corresponding element 10, is also designed to fit into an attachment seat 14 of prefixed shape provided in the mounting tower 4, on the side thereof opposite to the automotive finishing element 3 to be mounted, in particular at a top end 15 of the mounting tower 4 distant from the finishing element 3; according to this second embodiment, however, seat 14 is shaped to receive in a sliding manner the mounting element 10 in the direction and versus shown by the arrows in FIGS. 2 and 6, namely substantially parallel to the laying plane of the finishing element 3 bearing the mounting tower 4.

Accordingly, while first coupling means 11 are identical to those as described for the mounting device 1 of FIG. 1, second coupling means 112 are shaped differently, as it will be seen more in detail below, of coupling means 12, in particular coupling means 112 are provided flush with second flat wall 25.

In both embodiments, namely in both mounting devices 1 and 100, the first coupling means 11 are designed to receive in lateral sliding engagement the first coupling means 13 of the selected fastening system 2 to be mounted; this latter may include, as it is well known (see FIGS. 1, 2, 3 and 4), a shaped pin or toothed shank 40, a mounting bush 41 (FIGS. 1-2) or a flange 41' (FIGS. 3-4) and, possibly, a sealing element 42 interposed between pin 40 and bush 41; in any case, the first coupling means of the selected fastening system 2 consist in a head 13 of the shaped pin or toothed shank, which is received in use into the through seat 22 of the shallow mounting element, 10 or 110, according to the case.

The second coupling means 12 or 112, according to the case, are provided at least in part integral with the second flat wall 25. In particular, second coupling means 12 of shallow element 10 consist of thinner lateral portions 50 of the first flat wall 24 extending in cantilever fashion with respect to corresponding opposite lateral edges of the second flat wall 25; and of V-shaped elastic wings 52 extending perpendicularly from said first and second flat walls 24,25 in a direction facing away from said first flat wall 24.

First flat wall 24 is moreover provided, in correspondence the V-shaped elastic wings 52, with peripherally opened through perforations or recesses 54 arranged side by side to thinner lateral portions 50.

In case of device 100, the second coupling means 112 consist of laterally projecting portions 60 of the second flat wall 25 extending in cantilever fashion with respect to the corresponding opposite lateral edges of the first flat wall 24; and of opposite elastic arms 62 extending obliquely and in cantilever fashion within lateral recesses 64 of the laterally projecting portions 60 of the second flat wall 25.

The mounting device 1 is completed by a mouth aperture 70 to access the attachment seat 14, which aperture 70 is provided frontally through a portion of the top end 15 of the mounting tower 4 facing away from the finishing element 3; in use, a peripheral edge of the mouth aperture 70 cooperates in snap engagement with the V-shaped elastic wings 52 on a first side facing the interior of the attachment seat 14; at the same time a second side of the mouth aperture 70, opposite the first one, rests against the lateral portions 50 of the first flat wall 24.

The mounting device 100 is completed by a mouth aperture 170 to access the attachment seat 14, which aperture 170 is provided laterally through the top end 15 of the mounting tower 4; in this embodiment, moreover, within the attachment seat 14 is provided on each side thereof transverse to the mouth aperture 170 a resting teeth 80 (FIG. 6) able to be snap engaged by respective free ends of the elastic arms 62.

The device 100 according to the embodiment shown in FIGS. 2 and 4 (right side) is clearly of reduced height (measured perpendicularly to the laying plane of finishing element 3) in comparison to device 1 of FIGS. 1 and 4 (left side) and therefore fits for equipping portions of finishing element 3 to be mounted designed to be placed closer to the body of the vehicle and therefore leaving less mounting space to fastening system 2.

The invention claimed is:

1. A mounting device for connecting a finishing element to a body of an object, the mounting device comprising:
    a mounting tower fixable to the finishing element, the mounting tower having side walls and protrusions extending laterally from the side walls to form a receptacle between the side walls;
    a fastener for connecting the body of the object to the finishing element, said fastener having a shank and a head at an end of said shank; and
    an anchor for fixing said fastener to the mounting tower, the anchor comprising:
        an intermediate mounting element adapted to be interposed between the fastener and the mounting tower; and
        at least a coupler that extends from the mounting element and is insertable into the receptacle so as to be retained against the protrusions of the mounting tower,
    wherein the mounting element includes
    a first wall and a second wall opposite to the first wall and spaced from the first wall by a through seat in which the head of the fastener is receivable, and
    a cut-out portion formed through the first wall, said cut-out portion defining a passage that extends inwardly from a side edge of the first wall to a middle portion of the first wall,
    wherein the shank of the fastener is passable from the side edge to the middle portion of the first wall along said passage to insert the head of said fastener in the through seat.

2. The mounting device as claimed in claim 1, wherein the mounting element is an injection molded piece.

3. The mounting device as claimed in claim 1, wherein the coupler is at least in part integral with the second wall.

4. The mounting device as claimed in claim 3, wherein the coupler includes
    V-shaped elastic wings each comprising:
        a first section extending from the second wall away from the first wall; and
        a second section extending from the first section toward the first wall, said second section having an end that is engageable with a respective one of the protrusions of the mounting tower when the coupler is received in the receptacle.

5. The mounting device as claimed in claim 4, wherein
    the protrusions have a first side facing the interior of the receptacle and a second side opposite the first side, and
    the mounting element is receivable in the receptacle through a spacing between the protrusions until the protrusions engage in snap engagement with the V-shaped elastic wings on the first side and rest against lateral portions of the first wall on the second side.

6. The mounting device as claimed in claim 4, wherein the side walls of the mounting tower have perforations or recesses to engage with the V-shaped elastic wings.

7. The mounting device as claimed in claim 3, wherein the coupler includes
    elastic arms extending obliquely in a cantilever fashion from opposite side portions of the second wall.

8. The mounting device as claimed in claim 7, wherein
    the mounting element is slidable into the receptacle in a direction substantially parallel to the first and second walls, the side walls of the mounting tower being provided on each side thereof with resting teeth to be snap engaged by respective free ends of the elastic arms.

9. The mounting device as claimed in claim 7, wherein the coupler is flush with the second wall.

10. The mounting device as claimed in claim 7, wherein lateral portions of the coupler are slidingly insertable into the receptacle to be retained against the protrusions of the mounting tower.

11. The mounting device as claimed in claim 1, wherein the second wall is solid at a location corresponding to the middle portion of the first wall where the passage ends.

12. The mounting device as claimed in claim 1, wherein the first and second walls are flat and parallel to each other.

13. The mounting device as claimed in claim 12, wherein the passage has a width smaller than a diameter of the head to prevent removal of the head from the through seat in a direction normal to the first wall.

14. The mounting device as claimed in claim 13, wherein when the head of the fastener is received in the through seat, the shank of the fastener extends in a direction away from the second wall.

15. The mounting device as claimed in claim 14, wherein the coupler includes V-shaped elastic wings each comprising:
    a first section extending from the second wall away from the first wall; and
    a second section extending from the first section toward the first wall, said second section having an end that is engageable with a respective one of the protrusions of the mounting tower when the coupler is received in the receptacle.

16. The mounting device as claimed in claim 14, wherein the second wall is solid at a location corresponding to the middle portion of the first wall where the passage ends.

* * * * *